United States Patent
Haziza et al.

(10) Patent No.: US 10,700,426 B2
(45) Date of Patent: Jun. 30, 2020

(54) ANTENNA ARRAY WITH SQUARE WAVE SIGNAL STEERING

(71) Applicant: Wafer LLC, Hanover, NH (US)

(72) Inventors: Dedi David Haziza, Kiryat Motzkin (IL); Benjamin Rieger Claman, Somerville, MA (US)

(73) Assignee: WAFER LLC, Hanover, NH (US)

( * ) Notice: Subject to any disclaimer, the term of this patent is extended or adjusted under 35 U.S.C. 154(b) by 0 days.

(21) Appl. No.: 16/530,789

(22) Filed: Aug. 2, 2019

(65) Prior Publication Data

US 2020/0044338 A1 Feb. 6, 2020

Related U.S. Application Data

(60) Provisional application No. 62/713,986, filed on Aug. 2, 2018.

(51) Int. Cl.
| | | |
|---|---|---|
| *H01Q 21/06* | (2006.01) | |
| *H01Q 3/38* | (2006.01) | |
| *H01P 1/18* | (2006.01) | |
| *H01Q 21/22* | (2006.01) | |
| *H01Q 1/38* | (2006.01) | |
| *H04L 25/49* | (2006.01) | |
| *H01Q 1/28* | (2006.01) | |

(52) U.S. Cl.
CPC .............. *H01Q 3/38* (2013.01); *H01P 1/181* (2013.01); *H01Q 1/288* (2013.01); *H01Q 1/38* (2013.01); *H01Q 21/065* (2013.01); *H01Q 21/22* (2013.01); *H04L 25/4902* (2013.01)

(58) Field of Classification Search
CPC ........ H01Q 3/38; H01Q 1/288; H01Q 21/065; H01Q 1/38; H01Q 21/22; H04L 25/4902; H01P 1/181
See application file for complete search history.

(56) References Cited

U.S. PATENT DOCUMENTS

| | | | | |
|---|---|---|---|---|
| 9,711,852 | B2 * | 7/2017 | Chen ...................... | H01Q 13/20 |
| 2002/0109628 | A1 | 8/2002 | Diesel | |
| 2009/0058493 | A1 | 3/2009 | Arnold et al. | |
| 2009/0073332 | A1 * | 3/2009 | Irie ........................ | C09K 19/02 |
| | | | | 349/20 |
| 2013/0223486 | A1 | 8/2013 | Lin et al. | |

(Continued)

OTHER PUBLICATIONS

Transmittal of International Search Report and Written Opinion for International Application No. PCT/US2019/044993, 11 pages.

*Primary Examiner* — Kenneth T Lam
(74) *Attorney, Agent, or Firm* — Womble Bond Dickinson (US) LLP; Joseph Bach, Esq.

(57) ABSTRACT

An antenna array is steered electronically by controlling the transmission speed of the RF signal in feed line of each radiator in the array. The transmission speed is controlled using phase shifters, that include variable dielectric constant (VDC) material causing the change in transmission speed. The control signal applied to the VDC material generates the required phase shift. The control signal is calculated for each phase shifter in real time for each control cycle, so as to enable the main beam to track a target, such as a satellite. The control signal is a square wave signal, and each control signal has a specifically calculated duty cycle or frequency to generate the required phase shift.

22 Claims, 5 Drawing Sheets

(56) References Cited

U.S. PATENT DOCUMENTS

| | | | |
|---|---|---|---|
| 2015/0236412 A1* | 8/2015 | Bily | H01Q 3/247 |
| | | | 342/374 |
| 2018/0062268 A1* | 3/2018 | Haziza | H01Q 3/24 |
| 2018/0062272 A1* | 3/2018 | Haziza | H01Q 25/00 |
| 2018/0159213 A1* | 6/2018 | Haziza | H01Q 21/065 |

* cited by examiner

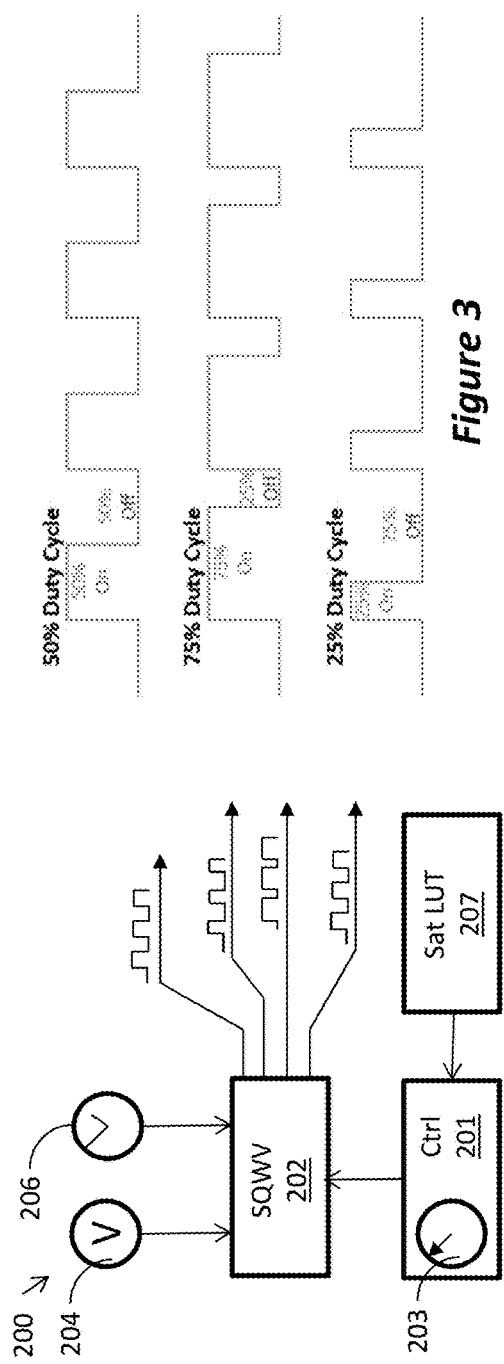
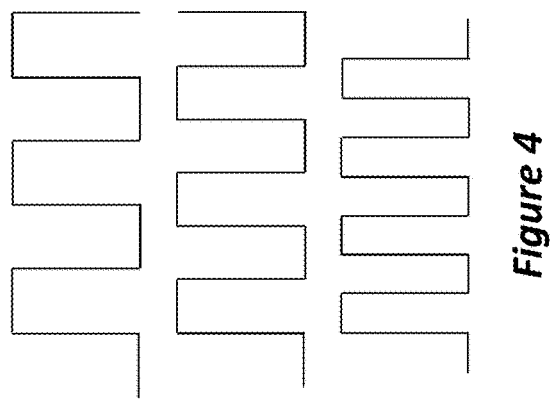
Figure 3
Figure 4
Figure 2

ANTENNA ARRAY WITH SQUARE WAVE SIGNAL STEERING

RELATED APPLICATION

This disclosure relates to and claims priority benefit to U.S. Provisional Application No. 62/713,986, filed on Aug. 2, 2018, the disclosure of which is incorporated herein by reference in its entirety.

BACKGROUND

1. Field

This disclosure relates generally to the field of liquid crystal-based antenna and, specifically, to the control of liquid crystal and or any and variable dielectric/phase material domain orientation for an RF antenna.

2. Related Art

Liquid crystals can be used in a variety of applications. A feature of liquid crystals is that external perturbation can cause significant changes in the macroscopic properties of the liquid crystal system. These changes in the macroscopic properties can be used in optical and electrical systems, to name just two. Both electric and magnetic fields can be used to induce these changes. The magnitudes of the fields, as well as the speed at which the molecules align are important characteristics for specific applications, the magnitude of the field applied on a liquid crystal and or other variable dielectric material would change its physical orientation and on the macroscopic level when a wave would pass through it or propagate in any TEM, TE or TM mode with that material presence would then see or feel a difference in the speed of light that would be directly related to the effective dielectric constant of the material which in the case of liquid crystals directly related to the mechanical turn tilt of the molecule under an induced electric or magnetic field.

Special surface treatments can be used in liquid crystal devices to force specific orientations of the dipole molecules, thus orienting the director by mechanical and or chemical influences to name few, mechanical rubbing, alignment materials, etc. The ability of the director to align along an external field is caused by the electric nature of the molecules. In this respect, the director refers to a dimensionless unit vector n that represents the direction of preferred orientation of the molecules in the neighborhood of any point. Permanent electric dipoles result when one end of a molecule has a net positive charge while the other end has a net negative charge. When an external electric field is applied to the liquid crystal, the dipole molecules tend to orient themselves along the direction of the field, since they are formed as a dipole.

In general systems, the molecules are aligned in one direction at the relax state, i.e., no external field applied. When a change is needed, an appropriate electrical and or equivalent magnetic field is applied, which causes the molecules to rotate an amount that correlates with the strength/moment of the applied field. When the effect is no longer required, the field is removed and the molecules return to their relaxed state. The two actions can be thought of as electrical and chemical reactions: when a field is applied, an electrical reaction occurs to rotate the molecules, and when the field is removed, a chemical reaction returns the molecules to their relaxed state. However, the electrical reaction occurs much faster than the chemical reaction. Thus, the temporal operations are not symmetrical—the "turning on" being much faster than the "turning off" which needs to be addressed for steerable antennas.

Dual-frequency liquid crystal (DFLC) is a liquid crystal (LC) mixture whose dielectric constant is switchable by frequency instead of solely by voltage. In these mixtures, the dielectric constant, $\varepsilon//$ highly depends on the frequency and usually the frequency ranges from kHz to MHz, and the dielectric constant, $\varepsilon\perp$ is dependent of frequency up to the MHz range; $\varepsilon//$ is the dielectric constant along the long axis of the molecules, and $\varepsilon\perp$ is the dielectric constant perpendicular to the long axis of the molecules. The arithmetic difference between $\varepsilon//$ and $\varepsilon\perp$ is the dielectric anisotropy, $\Delta\varepsilon$. For DFLC, $\Delta\varepsilon$ is positive at low frequency and is negative at high frequency thus for DFLC one applies an electrical field of equal amplitude but different frequencies to rotate the molecule from horizontal to vertical and then from vertical to horizontal respectively and hence the response time is no longer dependent on the relax state and or chemical process but rather on applied field and has the potential to reduce the response time accordingly.

The fast response DFLC has been used in adaptive optics for correcting atmospheric aberrations and optical phased array for laser beam steering. Liquid-crystal-based phased arrays require very little prime power, even for large apertures. Unlike mechanical systems, liquid crystal devices are generally insensitive to accelerations, and their costs can drop rapidly with volume production.

For further information on DFLC the reader is directed to, e.g., Liquid Crystal Materials and Liquid Crystal Displays, Martin Schadt, Annual Review of Materials Science 1997; and High Performance Dual Frequency Liquid Crystal Compounds and Mixture for Operation at Elevated Temperatures, Haiqing Xianyu, et. al., Liquid Crystals, 2010.

Recently, Applicant has proposed using liquid crystals for controlling the characteristics and operation of non-optical devices. Examples can be seen in U.S. Pat. Nos. 7,466,269 and 7,884,766, and Publication No. 2018-0062238. In such devices, the orientation of the director is controlled in order to change the dielectric constant of the liquid crystal layer, thereby changing the operational characteristics of electrical devices. However, as discovered by the subject inventors, in opposite to the conventional art, the asymmetric operation of liquid crystals is undesirable for such applications. The subject inventors have determined that when controlling the operation of electrical devices, it is desirable to have the "turn off" process to be as fast as the "turn on" process.

Additionally, when using a non-DFLC antenna array, every radiator in the array would require a different applied voltage to change the dielectric constant for that radiator. Such a system would require many voltage suppliers, each providing different voltage level, and a controller applying the different voltages to the different radiator, thus drastically increasing the complexity and cost of the system.

Moreover, prior art disclosures relating to DFLC use two different frequencies, one to "turn on" the LC and one to "turn off" the LC. The inventors have determined that utilizing such standard dual-frequency arrangement is inadequate for forming and controlling a scanning array.

Accordingly, a need exists in the art for improved control of the director in liquid crystals operating in antennas.

SUMMARY

The following summary of the disclosure is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Disclosed embodiments provide an improved control of the orientation of liquid crystal domains. The disclosed embodiments utilize multi-frequency control of variable dielectric constant (VDC) material to control the contribution of each radiator in the array so as to provide an electronically-scanned antenna array. Using arrangements of the disclosed embodiments each radiator in the array receives different activation signal which has different characteristics from the signal of the other radiators. Moreover, each signal for each radiator may change over time when either the platform of the antenna is moving or the platform of the target is moving.

In disclosed embodiments a single voltage source is provided, and is used to generate multiple signals, one for each radiator in the array. A pulse width modulator (PWM) generates the multiple signals such that each of the signals has a different duty cycle, thus in essence applying a different power level to the delay line of the radiator. In other embodiments, the duty cycle remains constant, but each signal has different frequency. In these embodiments the pulse width modulator generates multiple frequencies which, in this disclosure may mean that in every cycle the number of frequencies generated may be equal to the number of radiators in the antenna. To be sure, "multiple frequencies" means more than two frequencies, as generally used in optical devices to generate on and off signals.

In disclosed embodiments the antenna array comprises a two-dimensional array of radiators, each having a delay line meandering over a VDC having its dielectric constant controlled by a pulse width modulated signal. A plurality of electrodes are provided to deliver independent control PWM signal to each VDC to enable rapid placement of the domain in a desired state thereby control the direction of the main beam of the antenna.

In general aspects, disclosed embodiments use voltage-dependent difference in dielectric anisotropy in a tunable phased array antenna application. In such embodiments, a square wave of multiple duty cycle is applied to orient the LC directors of different phase shifters, which yields a given dielectric constant. The change in dielectric constant causes a change in phase of the signal traveling in the phase shifter. Multiple duty cycles may refer to a number of duty cycles equal to the number of phase shifters in the array.

In general aspects, disclosed embodiments use frequency-dependent difference in dielectric anisotropy in a tunable phased array antenna application. These embodiments implement dual-frequency liquid crystal (DFLC) materials as part of a phase shifter element with a layered, or sandwich structure. In such a tunable phase shifter, a square wave of multiple frequencies is applied to orient the LC directors of different phase shifters, which yields a given dielectric constant and more importantly allows the rotation of the dual frequency molecule in two opposite directions by responding to two fields with different frequencies. This mechanism allows to have an equal $t_{rise}$ and $t_{fall}$ for the molecule and also allows change in dielectric constant to causes a change in the phase of the signal traveling in the phase shifter. The result is a faster response time, especially for the typically slower decay side when the LC molecules are slow to relax. Therefore, the combined switch time (Trise+Tdecay/fall) will be much faster than a phase shifter built with regular LC. As a consequence, the newly invented DFLC phase shifter antenna with pulse width modulation will meet the beam steering speed required for satellite communication antennas.

In disclosed embodiments, a fast switching nematic liquid crystal (LC) phase shifter is provided, based on the DFLC effect. The switching of the DFLC phase shifter corresponding to each delay line of the antenna array is controlled independently by applying a frequency controlled fixed voltage square wave voltage signal to the electrodes of the DFLC phase shifter. In some embodiments, both electrodes of the DFLC phase shifter are driven by the frequency controlled fixed voltage square wave voltage, so the liquid crystal molecules natural self-relaxing time no longer affects the switching time.

According to one embodiment, the dual frequency LC control is used with one arrangement for Parallel spin and the other for perpendicular rotation.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

One or more embodiments of the present invention are illustrated by way of example and not limitation in the figures of the accompanying drawings, in which like references indicate similar elements and in which:

FIG. 2 is a simplified schematic of a pulse width modulation control according to an embodiment.

FIG. 3 is a plot showing square wave signals having different duty cycles.

FIG. 4 is a plot showing square wave signals having different frequencies.

DETAILED DESCRIPTION

Embodiments of the inventive antenna and control will now be described with reference to the drawings. Different embodiments or their combinations may be used for different applications or to achieve different benefits. Depending on the outcome sought to be achieved, different features disclosed herein may be utilized partially or to their fullest, alone or in combination with other features, balancing advantages with requirements and constraints. Therefore, certain benefits will be highlighted with reference to different embodiments, but are not limited to the disclosed embodiments. That is, the features disclosed herein are not limited to the embodiment within which they are described, but may be "mixed and matched" with other features and incorporated in other embodiments.

As with all RF antennas, reception and transmission are symmetrical reciprocal in passive antennas such that a description of one equally applies to the other, which the class of the antennas and the devices presented herein fall into. Active antennas, including none-linear devices, aren't reciprocal. In this description it may be easier to explain transmission, but reception would be the same, just in the opposite direction. Also, in the disclosed embodiments it is assumed that the disclosed antenna is mounted onto a platform, and its main beam is aimed at another antenna, herein referred to as the target. The antenna of the target is also mounted on a platform, and either or both platforms may be moving. For example, the antenna may be mounted on a vehicle, such as an airplane, a ship, an automobile, etc., and the target may be mounted on, e.g., a satellite. The symmetry concept applies here as well, as the antenna may be the one that is mounted on the satellite, while the target may be mounted on a vehicle.

Figure 1:
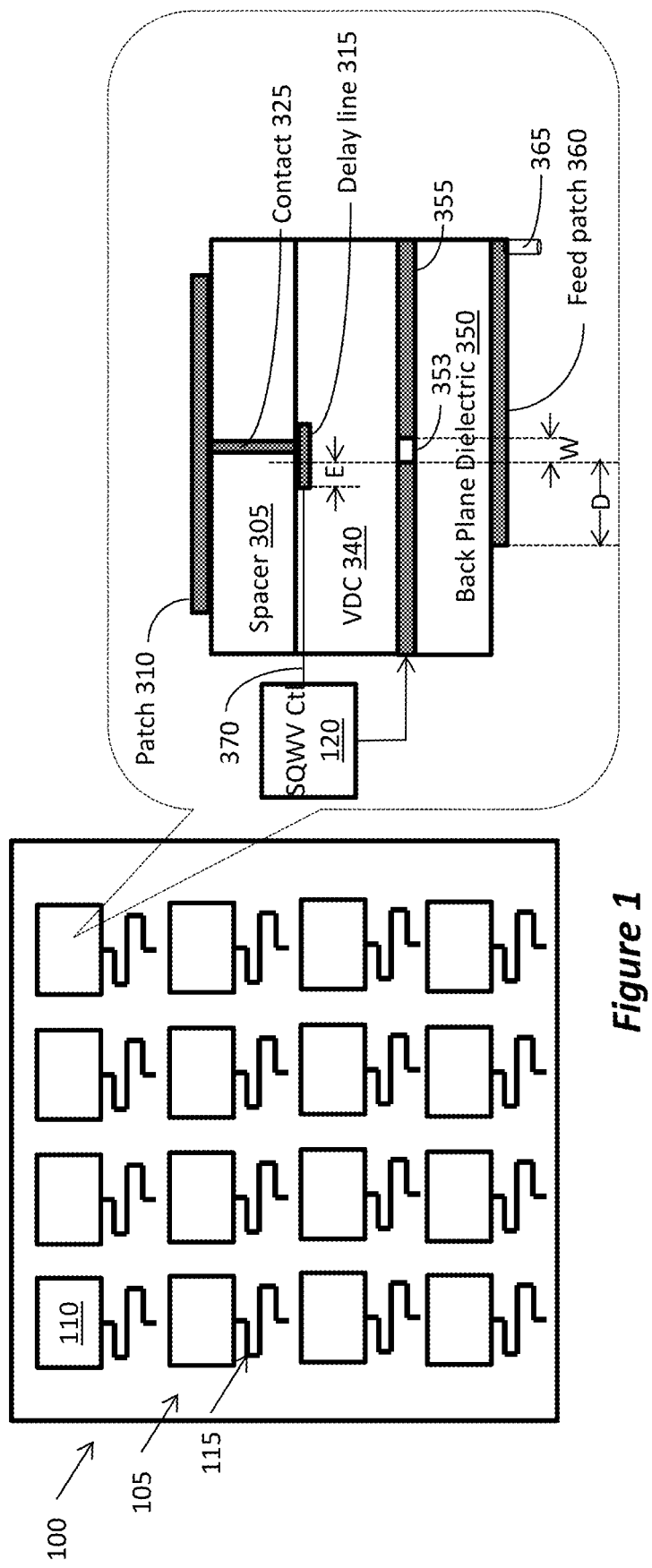
FIG. 1 illustrates an antenna array according to an embodiment, having a controller for individually controlling each radiator thereby scan the main beam, which can be done by many different variants and be designed with multi-layer and or single later structures.

The top view of the antenna is illustrated in the schematic of FIG. 1, while the schematic in the callout shows a simplified cross-section of the array at one radiating element. Generally, the antenna is a multi-layer antenna that includes the radiating patch layer, the true time delay layer, the ground layer, and the feed layer be it designed a corporate feed, traveling wave feed or standing wave fields, as will be described in more details below. In some instances, additional layers are added, providing multiple polarization, wider bandwidth, etc. The various elements of the antenna may be printed or deposited on the insulating substrates.

The antenna comprises a two-dimensional array of n×m radiating elements, n and m being integers. In the illustration of FIG. 1, the antenna in this particular example comprises a 4×4 array of radiators 110, although any number of radiators in various geometries and arrangements may be used, and a square arrangement of 4×4 elements is chosen only as one example. In this example each radiator 110 is a conductive patch provided (e.g., deposited, adhered to, or printed) on top of an insulation layer 105 and has a delay feed line 115 coupled to it, either physically or capacitively. Each delay feed line 115 is a conductor that provides the RF signal to its corresponding patch 110. The RF signal can be manipulated, e.g., delayed to change the phase, by controlling a variable dielectric layer positioned under the delay line. By independently controlling all of the delay lines to change the phase of the RF signal in each delay line, the main beam of the array can be made to point to different directions, as needed, thus providing an electronically scanning array.

In FIG. 1 each element is fed from only one delay line. However, each radiating element 110 can be fed by two orthogonal feed lines, for example, each having different polarization. The description provided herein is applicable to both and any similar, architectures.

As shown in the callout, a top dielectric spacer 305 is generally in the form of a dielectric (insulating) plate or a dielectric sheet, and may be made of, e.g., glass, PET, etc. The radiating patch 310 is formed over the spacer by, e.g., adhering a conductive film, sputtering, printing, etc. At each patch location, a via is formed in the dielectric spacer 305 and is filled with conductive material, e.g., copper, to form contact 325, which connects physically and electrically to radiating patch 310. A delay line 315 is formed on the bottom surface of dielectric spacer 305 (or on top surface of upper binder 342), and is connected physically and electrically to contact 325. The delay line 315 is bathing in the variable dielectric material 340, which provides the most impact/RF phase change, as any additional layer separating the delay line from the variable dielectric material would reduce the tunability of the device. That is, in this example there is a continuous DC electrical connection from the delay line 315 to radiating patch 310, through contact 325. As shown in FIG. 1, the delay line 115 is a meandering conductive line and may take on any shape so as to have sufficient length to generate the desired delay, thereby causing the desired phase shift in the RF signal, the electrodes for activating the VDC 340 can be part of the delay line and ground and or could be designed on separate layers.

The delay in the delay line 315 is controlled by the VDC layer 340 having VDC material. While any manner for constructing the VDC layer 340 may be suitable for use with the embodiments of the antenna, as a shorthand in the specific embodiments the VDC plate 340 is shown bounded between spacer 305 and backplane dielectric 350 (in this example the VDC material may be a standard liquid crystal, or a liquid crystal that reacts to different frequencies for alignment and relaxation states). Adhesive such as epoxy or glass beads may be used to maintain the LC material inside the layer 340.

The effective dielectric constant of VDC plate 340 can be controlled by applying DC potential across the VDC plate 340. For that purpose, electrodes may be formed and connected to controllable voltage potential, or control lines 370 may be connected to the delay lines 315, such that delay lines 315 function as activation electrodes. There are various arrangements to form the electrodes, and any conventional arrangement is acceptable, so long as multiple frequencies can be applied to control the state of the VDC material. In the arrangement shown in the callout square wave controller 120 applies the signal across the delay line and the ground plane 355. Each delay line 115 and its associated VDC form part of a phase shifter.

The control lines 370 are shown connected to a square wave controller control 120, which may provide pulse width modulation (PWM) and or the frequency control and/or the standard voltage, as will be described in details below. By changing the signal from controller 120 applied to each pair of control lines, one can change the dielectric constant of the VDC material in the vicinity of the corresponding delay line 315, and thereby change the RF signal traveling over delay line 315. Changing the output of the controller, can be done by running software that causes the controller to output the appropriate control signal to set the appropriate phase shift on each feed line in real time. Thus, the antenna's performance and characteristics can be controlled using software—hence providing a software controlled antenna.

In transmission mode the RF signal is applied to the feed patch 360 via connector 365 (e.g., a coaxial cable connector). As shown in the callout, there is no electrical DC connection between the feed patch 360 and the delay line 315. This is in order to isolate the various phase shifters from another so that one control line on an individual phase shifter will not be shorted to the other phase shifters and hence wouldn't allow individual control of each phase shifter. In some embodiments when we would like to control a group of phase shifter and or would incorporate a separate non-galvanic coupler in the feeding network, that slot could be replaced by contact line or via. However, in disclosed embodiments the layers are designed such that an RF short is provided between the feed patch 360 and delay line 315 which can be changed. This feature is not germane to the invention, but is shown as an example.

A back plane conductive ground (or common) 355 is formed on the top surface of backplane insulator (or dielectric) 350. The backplane conductive ground 355 is generally a layer of conductor covering the entire area of the antenna array and forms the ground for the RF signal traveling in all of the delay lines 115. At each RF feed location a window (DC break) 353 is provided in the back plane conductive ground 355. The RF signal travels from the feed patch 360, via the window 353, and is capacitively coupled to the delay line 315. The reverse happens during reception. Thus, a DC open and an RF short are formed between delay line 315 and feed patch 360.

In one example the back plane insulator 350 is made of a Rogers® (FR-4 printed circuit board) and the feed patch 360 may be a conductive line formed on the Rogers. Rather than using Rogers, a PTFE (Polytetrafluoroethylene or Teflon®) or other low loss material may be used.

In disclosed embodiments the control of the VDC of each delay line is done individually and in real time, i.e., the signal applied to each pair of electrodes is determined individually to each pair of electrodes, and may change at each control cycle, depending on the movement of the platform and/or the target. Thus, the control system determines a direction for the main beam and generates multiple control signals, wherein each VDC may receive a signal at different duty cycle or different frequency, which may change over time in order to steer the main beam.

The following are some examples of individual, real-time control of the delay lines. In one example, two electromagnetic waves of the same amplitude are applied one to each electrode. The phase offset of one wave relative to the other is changed to move the LC molecules to the desired position. In another example, one electromagnetic wave with a variable shape (duty cycle) but constant amplitude is applied to the electrodes (one electrode being the return or ground). The shape of the electromagnetic wave is varied to move the LC molecules to the desired position. In yet another example, two electromagnetic waves are applied to the electrodes, each with variable shape but constant amplitude. The shape of each wave is varied simultaneously to move the LC molecules to the desired position. In a further example, the two electromagnetic waves have constant shape and constant amplitude, but variable frequency.

In disclosed examples, a controller uses an array of constant voltage electronic switches to create patterns across multiple dual-electrode LC cells. The controller may generate multiple signals of different duty cycle or frequencies to generate different delay on each delay line. Depends on the material and how it responds to the signal.

Proceeding with the example of FIG. 1, the dual-electrode LC cell responds to the root-mean-squared voltage applied across the two electrodes 343 and 347. The amplitude of the applied voltage changes the position of the LC inside the cell, controlling the properties of the dielectric. Varying the voltage can supply a high degree of control over the position of the LC cell, thus changing the resulting delay on the delay line 115 for each radiator 110. However, independently varying the voltages on each pair of electrodes of a large array requires a large number of electronic components to create the desired voltage levels for each cell. Generally, any way to change the root-mean-squared voltage applied to the cell will control the liquid crystal inside of it.

Disclosed examples generate multiple signals of different resulting voltages but using a single source by implementing pulse width modulation. For example, two positive biased square waves can be applied, one to each electrode, while controlling the phase between the signals. For example, when each signal has a 50% duty cycle, if the signals are in sync (zero degrees shift with respect to each other) the summation of the two signals generates maximum delivered power. If a 50% duty cycle signals are applied out of sync (180° shift with respect to each other) the result is zero sum power. The shift may be set anywhere in between zero and 180°, so as to vary the state of the liquid crystal cell. For a further fine control, the duty cycle of the signals can be set other than 50%.

By changing the duty cycle of the square wave inputs to the LC cell (and antenna), we can change the state of the liquid crystal without changing the amplitude of the applied wave. This allows for more affordable system design i.e. digital control circuitry used rather than analog signals and devices, because no voltage step levels are required. That is, the voltage level does not change, but very fine control can be exerted over the cell by control of the duty cycle and/or phase. Notably, while for optical liquid crystal devices control of on and off states is sufficient, in order to accurately control the radiators of an antenna array to generate a steerable main beam, there's a need for finely controlling the state liquid crystal, rather than a simple on-off control.

The response of liquid crystals to applied field allows for similarly fine control of an LC cell by changing the PWM duty cycle, but keeping the voltage constant. This dependence on delivered energy causes the LC to respond to any PWM duty cycle, allowing for much finer beam forming and steering in real time. Thus, the disclosed embodiments enable communication even when both the platform and target are in motion.

FIG. 2 is simplified schematics illustrating the concept of controlling the delay lines of the array in real time using pulse width modulation (PWM), particularly beneficial for antennas using standard liquid crystal or dual-frequency liquid crystal as the VDC material. The control 200 includes a controller 201, which calculates or receives the antenna pointing direction 203. The antenna pointing direction is generated in real time, so as to enable tracking of the target. When the target is a satellite, the pointing direction can be calculated e.g., using the known position of the satellite in the sky, GPS coordinates of the antenna platform, accelerometer indicating physical orientation of the antenna relative to the platform, and a compass for magnetic north. The known position of the satellite in the sky can be obtained by fetching the coordinates of the satellite from a satellite look up table 207, which lists the various satellites and their location in the sky. Using the antenna pointing direction, the appropriate phase shift for each radiator can be calculated, so as to point the main beam in the direction of the target. The information about the phase shift amount for each radiator is then translated into a PWM for each of the phase shifters.

The square wave controller 202 receives a control signal indicating the PWM for each of the radiators. Based on the control signal, the square wave controller 202 modulates the output of the constant voltage power supplier 204, with reference to clock 206. In one embodiment, the duty cycle of the output for each of the electrodes is calculated independently in real time, such that each of the outputs has a different duty cycle calculated to introduce phase delay at each radiator, thus controlling the direction of the resulting main beam. By properly introducing delay at each radiator, the array of radiators generates a main beam aimed at the target. As the platform and/or the target moves, the duty cycle of each output is changed so as to ensure tracking of the target by the main beam.

FIG. 3 is a plot showing example of different duty cycles for signals generated to cause different delays. The uppermost plot is for a 50% duty cycle, wherein the signal is a square wave at 50% of the time at maximum amplitude and 50% of the time off, i.e., zero amplitude. The middle plot is for a signal having 75% duty cycle with 75% of the time at maximum amplitude and 25% of the time off. The bottom plot shows the reverse of the middle plot, wherein the square wave signal is 25% of the time at maximum amplitude and 75% of the time off. Of course, the signals can assume any duty cycle and these are but three examples.

When the VDC material is a dual-frequency liquid crystal, it is preferable to control the frequency of the control signal with fixed voltage i.e. digital controller rather than analog, not the duty cycle. In this manner, for each delay line a specific activation frequency is calculated to generate the precise domain rotation needed for the required phase shift. The frequency is calculated for each delay line at each cycle, so that the delay is determined in real time.

FIG. 4 illustrate an example of three square-wave signals, all having 50% duty cycle, but different frequencies. Thus, for such a system, the controller 201 sends the appropriate control signal to the square wave controller 202 to generate the different signals of different frequencies, but maintains the same duty cycle across all of the signals. Notably, while the VDC material is a dual-frequency material, the square wave controller 202 generates multiple frequencies so as to vary the amount of crystal domain alignment individually for each delay line. Also, the simplification is enhanced by the use of a single power supplier 204 of a constant voltage for all of the signals.

As can be understood from the disclosure, in a method for controlling the antenna array to track a target, the coordinates in space of the target are obtained. This can be done, e.g., by referring to a look-up table which lists coordinates of various targets, such as satellites. Also, the physical orientation of the antenna array is obtained. That is, the antenna array may be, e.g., a flat plate upon which the plurality of radiating elements are formed. The pointing direction of an orthogonal line emanating from the middle of the plate is tantamount to boresight, and its pointing direction can be defined as the physical orientation of the antenna array. In the embodiments disclosed herein the main beam is made to track a target by electronic, not mechanical, steering. That is, by shifting the phase of the signal traveling in the feed of the various radiating elements the main beam deviates from boresight, such that the beam can be scanned electronically, while maintaining the physical orientation of the antenna unchanged. Of course, when the platform is moving, the physical orientation of the antenna does change, so that a corresponding electronic steering needs to be done to correct for that motion.

Using the target coordinates, the physical orientation of the antenna, e.g., from compass, GPS coordinates of the platform, an accelerometer, etc., the electronic steering of the main beam is determined. The electronic steering of the main beam is a result of the summation of all of the RF signals from the array of radiators, which is controlled by the speed that the RF signal travels on each of the delay lines, thus generating a delay, leading to a phase shift. As noted herein, each feed line needs to have its individual phase shift calculated in real time for each cycle of steering control signal. As shown herein, the phase shift is controlled by changing either the duty cycle or the frequency of a square wave generated individually for each radiator.

Figure 5:
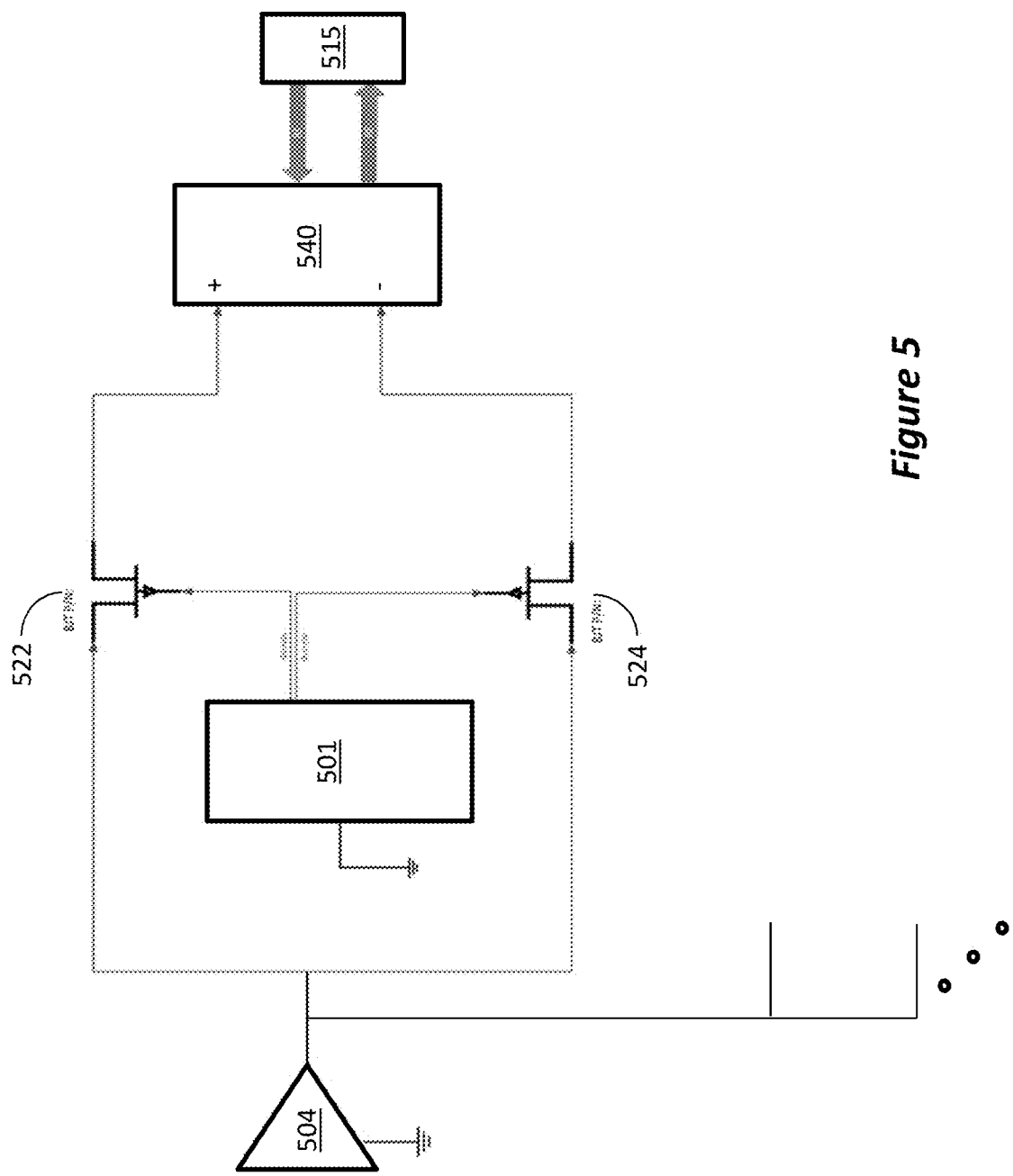
FIG. 5 is a schematic illustrating a system for controlling phase shifters of an array, according to one embodiment.

FIG. 5 illustrates an example for providing PWM or frequency control signal to one of the delay lines. Power supplier 504 outputs a constant voltage potential which is used to activate all of the delay lines. To simplify, in FIG. 5 the details of only one output line are shown, but in actuality the line will be split into many parallel lines, all carrying the same voltage potential as indicated by the ellipses. The voltage potential is tailored to rotate the liquid crystals of each delay line 540 at an amount determined to cause a required delay of the RF signal in that line.

In this example, two lines are provided for the LC rotation, positive and negative lines, so as to enable fixed amplitude either frequency control and or Pulse width modulation control according to any of the embodiments disclosed herein. In this example, each of the positive and negative lines is connected to a corresponding bipolar junction transistor 522 and 524. The sources of transistors 522 and 524 are connected to the power supplier 504 and the gates of transistor 522 and 524 are connected to the controller 501. By sending actuation signals to the gates of transistors 522 and 524, the controller generates a square wave having either variable duty cycle or variable frequency.

Figure 6:
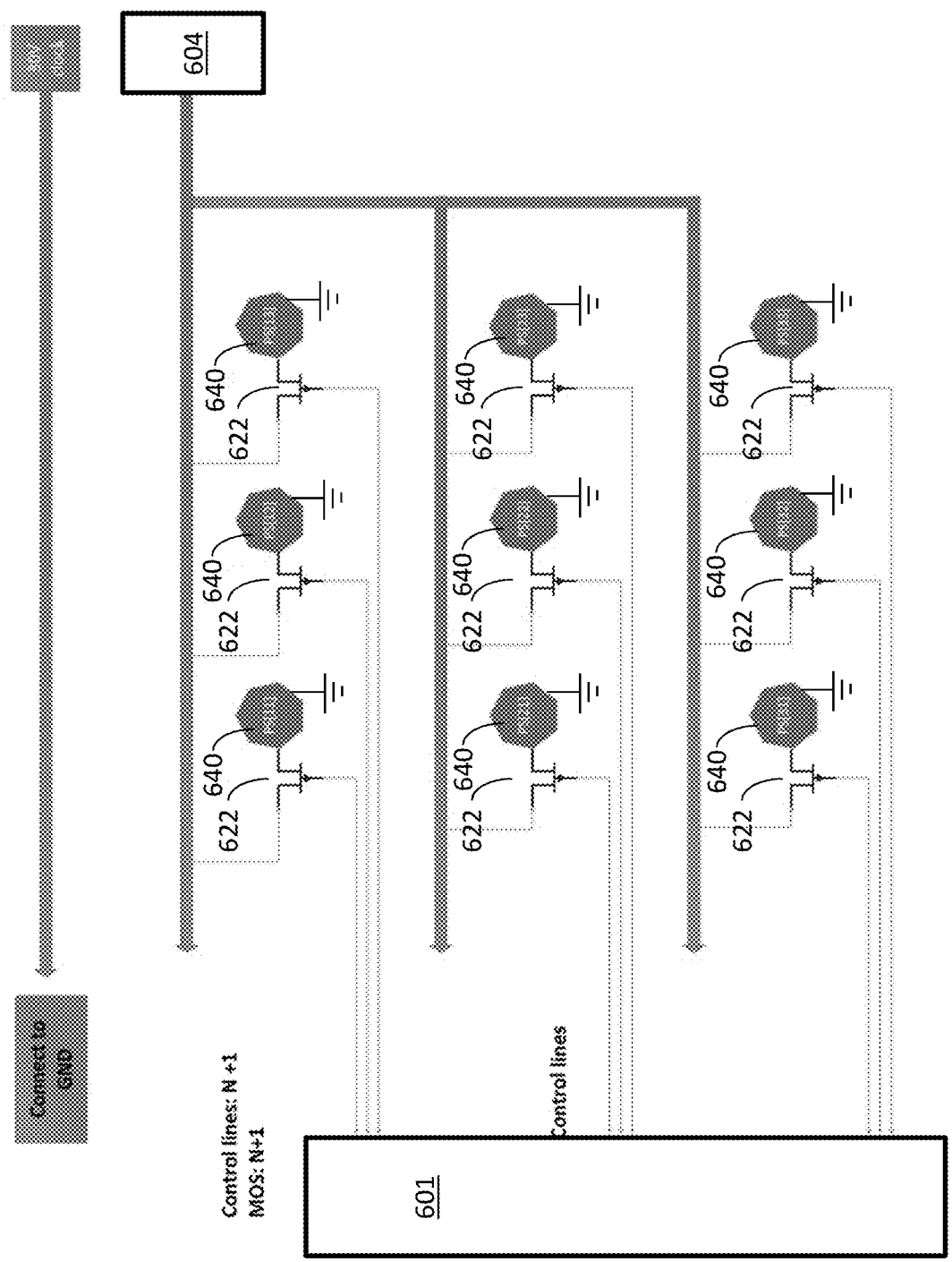
FIG. 6 is a schematic illustrating a system for controlling phase shifters of an array, according to another embodiment.

FIG. 6 illustrates an antenna array system wherein each phase shifter is controlled by only one control line, the other being connected to ground or common potential. In FIG. 6 only 3×3 phase shifters are shown, but the array may be of any n×m size. Power supplier 604 provides constant voltage potential that is applied to the source of all of the transistors 622, one for each phase shifter. The drain of each of the transistors 622 is connected to the respective phase shifter 640. Controller 601 sends activation signals to the gate of each of the transistors 622 to thereby generate a square wave of either varying duty cycle of frequency.

Figure 7:
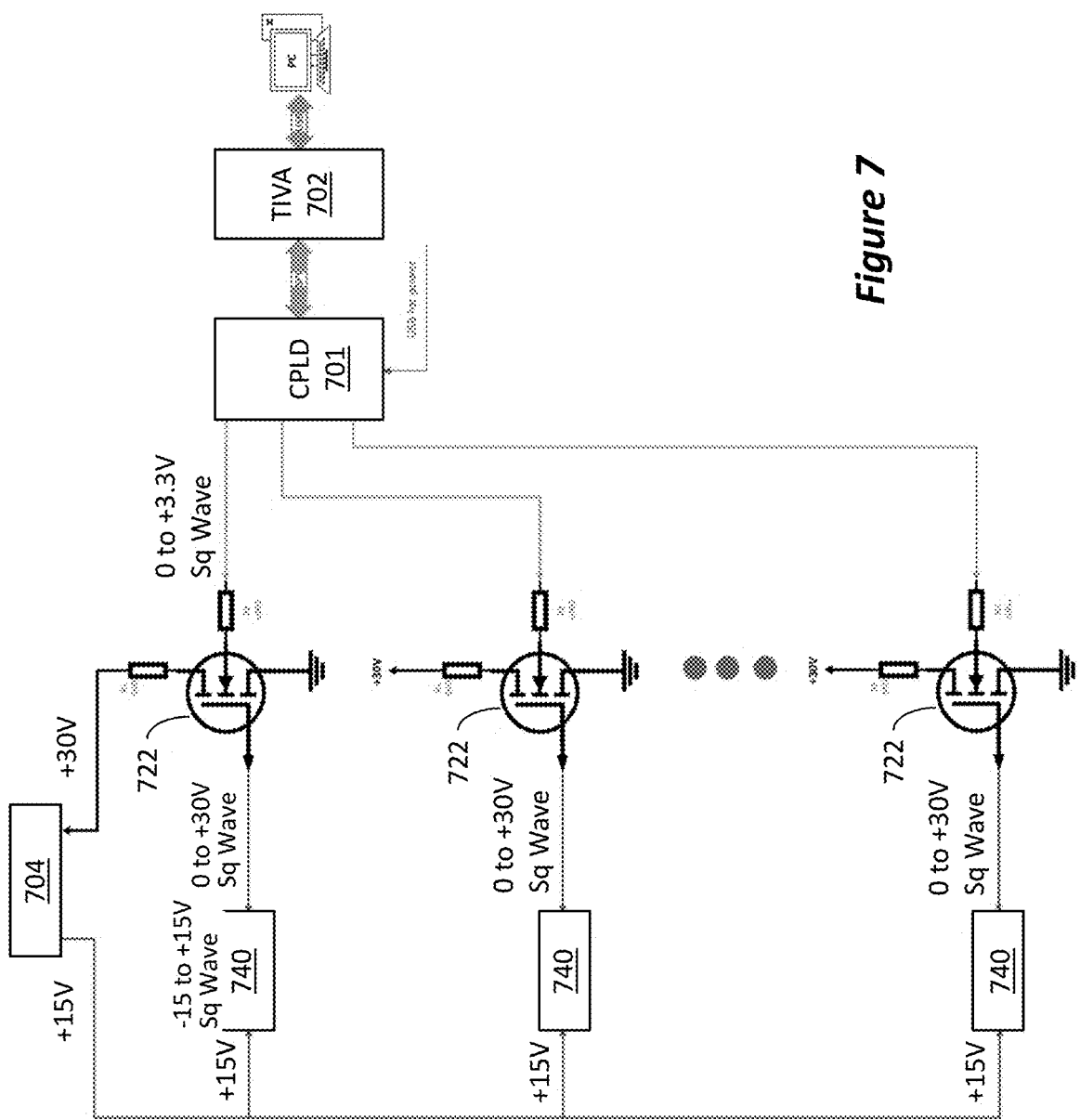
FIG. 7 is a schematic illustrating a system for controlling phase shifters of an array, according to one more embodiment.

FIG. 7 illustrates a system for PWM control, wherein the negative side of the phase shifter receives a constant common voltage, here set at +15V, and the positive side receives a PWM signal of zero to +30V. Consequently, the phase shifter is activated using a square wave of −15V to +15V. This set-up is controlled using a TIVA microcontroller 702, which incorporates an internal clock system for controlling the PWM signals. The TIVA microcontroller is coupled via a USB (Universal Serial Bus) to a personal computer PC for programming and monitoring. On the other side the microcontroller 702 is coupled to a CPLD 701 (Complex Programmable Logic Device) via an SPI (Serial Peripheral Interface). The output of the CPLD 701 is multiple square waves of zero to 3.3V, individualized for each of the phase shifters 740, and calculated for each refresh cycle. Each individual output signal of the CPLD 701 is applied to a corresponding transistor 722, which translates the signal into a square wave of zero to 30 volts. This signal is applied to the positive side of the corresponding phase shifter.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

The invention claimed is:

1. An antenna array system with square wave steering control, comprising:
   an array of radiators comprising a plurality of radiating patches;
   a plurality of delay lines, each delay line providing RF coupling to a corresponding one of the radiating patches;
   a plurality of variable dielectric-constant (VDC) zones, each VDC zone configured to change transmission speed in a corresponding one of the delay lines;
   a plurality of control lines, each configured to deliver control signal to one of the VDC zones;
   a constant voltage power supplier;
   a square wave modulator receiving a constant voltage signal from the power supplier and generating a plurality of square wave signals, each square wave signal coupled to one of the control lines and having independent pulse width or frequency, such that each of the square wave signals has a different duty cycle or a different frequency.

2. The antenna array system of claim 1, wherein the VDC zones comprise liquid crystal zones and the square wave modulator outputs an independent duty cycle for each square wave signal in real time.

3. The antenna array system of claim 1, wherein the VDC zones comprise dual-frequency liquid crystal zones and the square wave modulator outputs an independent frequency for each square wave signal in real time.

4. The antenna array system of claim 1, further comprising a plurality of transistors, each coupled to one of the control lines, and wherein each square wave signal is applied to a gate of one of the plurality of transistors.

5. The antenna array system of claim 4, wherein:
   the constant voltage power supplier is a dual voltage power supplier providing a first constant voltage and a second constant voltage;
   each VDC zone has two control lines, one coupled to the first constant voltage and one coupled to an output of a corresponding transistor of the plurality of transistors;
   and wherein the source of each of the plurality of transistors is coupled to the second constant voltage.

6. The antenna array system of claim 4, wherein each VDC zone has two control lines, one coupled to common potential and one coupled to an output of a corresponding transistor of the plurality of transistors.

7. The antenna array system of claim 4, wherein:
   each VDC zone has two control lines, each coupled to an output of a corresponding transistor of the plurality of transistors;
   and wherein a source of each of the plurality of transistors is coupled to the constant voltage power supplier.

8. The antenna array system of claim 1, further comprising an accelerometer and a controller, the accelerometer providing an output signal indicative of relative motion of the antenna array to the controller, the controller using the output signal to calculate a control signal to the square wave modulator.

9. The antenna array system of claim 8, further comprising a satellite look up table, listing locations of various satellites in the sky.

10. The antenna array system of claim 1, further comprising a controller calculating appropriate phase shift for each of the radiating patches according to a desired antenna pointing direction and generating a control signal for the square wave modulator.

11. The antenna array system of claim 10, wherein the controller comprises an internal clock.

12. The antenna array system of claim 11, wherein the controller further determines the desired antenna pointing direction according to physical orientation of the array of radiators.

13. The antenna array system of claim 10, wherein the controller determines the desired antenna pointing direction according to coordinates of a target.

14. The antenna array system of claim 10, wherein the controller calculates a steering direction for a main beam of the array of radiators according to coordinates of a target and physical orientation of the array of radiators.

15. The antenna array system of claim 14, wherein the controller changes the duty cycle or frequency of each of the plurality of square wave signals in real time according to the steering direction.

16. The antenna array system of claim 10, wherein the controller comprises an input receiving coordinates of satellites.

17. An antenna array system with square wave steering control, comprising:
   an array antenna comprising:
      an array of radiators;
      a plurality of delay lines, each delay line providing RF coupling to a corresponding one of the radiators;
      a plurality of variable dielectric-constant (VDC) zones, each VDC zone configured to change transmission speed in a corresponding one of the delay lines, each VDC zone comprising a dual-frequency liquid crystal (DFLC) material having dielectric constant switchable by frequency;
      a plurality of control lines, each configured to deliver control signal to one of the VDC zones;
   a control of directors of the DFLC material, comprising:
   a constant voltage power supplier;
   a square wave modulator receiving a constant voltage signal from the power supplier and generating a plurality of square wave signals, each square wave signal coupled to one of the control lines and having a different frequency from, and same amplitude as, the other square wave signals.

18. The antenna array system of claim 17, further comprising a controller providing control signals to the square wave modulator, the controller changing the frequency of each of the plurality of square wave signals in real time according to a steering direction of main beam of the antenna array.

19. The antenna array system of claim 18, wherein the controller calculates the steering direction for the main beam according to coordinates of a target and physical orientation of the array antenna.

20. The antenna array system of claim 17, further comprising a plurality of transistors, each coupled to one of the control lines, and wherein each square wave signal is applied to a gate of one of the plurality of transistors.

21. The antenna array system of claim 20, wherein each VDC zone has two control lines, one coupled to common potential and one coupled to an output of a corresponding transistor of the plurality of transistors.

22. The antenna array system of claim 20, wherein:
   the constant voltage power supplier is a dual voltage power supplier providing a first constant voltage and a second constant voltage;

each VDC zone has two control lines, one coupled to the first constant voltage and one coupled to an output of a corresponding transistor of the plurality of transistors; and, wherein the source of each of the plurality of transistors is coupled to the second constant voltage.

* * * * *